United States Patent [19]

Ramer et al.

[11] Patent Number: 5,773,819
[45] Date of Patent: Jun. 30, 1998

[54] SINGLE ELEMENT LIGHT DETECTOR

[75] Inventors: David P. Ramer, Dayton, Ohio; Jack C. Rains, Jr., Herndon, Va.

[73] Assignee: Advanced Optical Technologies, LLC., Chevy Chase, Md.

[21] Appl. No.: 589,105

[22] Filed: Jan. 23, 1996

[51] Int. Cl.⁶ ............................................. G01J 1/04
[52] U.S. Cl. ............................. 250/228; 356/236
[58] Field of Search ................... 250/228, 216; 356/236

[56] References Cited

U.S. PATENT DOCUMENTS

| | | |
|---|---|---|
| 1,267,967 | 5/1918 | Brunnworth et al. . |
| 1,640,448 | 8/1927 | Halvorson, Jr. . |
| 1,676,463 | 7/1928 | Ryan . |
| 2,469,412 | 5/1949 | Roebken . |
| 2,969,018 | 1/1961 | Erst et al. . |
| 3,637,309 | 1/1972 | Hosterman . |
| 3,772,506 | 11/1973 | Junginger . |
| 3,777,160 | 12/1973 | Bernt . |
| 3,809,911 | 5/1974 | Natens ................................. 250/571 |
| 3,968,363 | 7/1976 | Mielenz et al. .................. 250/228 |
| 4,027,161 | 5/1977 | Williams et al. . |
| 4,144,556 | 3/1979 | Bond . |
| 4,309,746 | 1/1982 | Rushworth . |
| 4,443,706 | 4/1984 | DiMatteo et al. . |
| 4,667,112 | 5/1987 | Grossman . |
| 4,711,998 | 12/1987 | Malek . |
| 5,051,872 | 9/1991 | Anderson . |
| 5,105,347 | 4/1992 | Rund et al. . |
| 5,153,426 | 10/1992 | Konrad et al. . |
| 5,227,632 | 7/1993 | Armstrong et al. ............. 250/353 |
| 5,309,339 | 5/1994 | Webb . |
| 5,393,970 | 2/1995 | Shau et al. . |
| 5,440,116 | 8/1995 | Bolander et al. ............... 250/216 |
| 5,471,053 | 11/1995 | Diner et al. ...................... 250/228 |
| 5,510,893 | 4/1996 | Suzuki . |
| 5,519,534 | 5/1996 | Smith et al. . |
| 5,532,473 | 7/1996 | Chin . |
| 5,556,189 | 9/1996 | Wallis . |

FOREIGN PATENT DOCUMENTS 516361  1/1940  United Kingdom .

*Primary Examiner*—Edward P. Westin
*Assistant Examiner*—Kevin Pyo
*Attorney, Agent, or Firm*—McDermott, Will & Emery

[57] ABSTRACT

A single element hemispherical light detector that employs the concept of constructed occlusion to improve its uniformity of detection response across a large range of incident angles, and that incorporates a deflector to provide detection response to low incidence angles. The hemispherical light detector uses one active element or photodiode to achieve a substantially uniform response within a sector of a hemisphere.

10 Claims, 4 Drawing Sheets

SINGLE ELEMENT LIGHT DETECTOR

BACKGROUND OF THE INVENTION

The present invention relates generally to light detectors that are relatively insensitive to the angle of incident light over a predetermined spherical sector and, more particularly, to light detectors that uniformly detect light from any direction in a hemisphere and provide a measurement of the light's intensity.

A planar photodiode is an example of a light detector that is sensitive to the angle of incident light. The photodiode's planar or flat surface exhibits a maximum cross-sectional area to light that is incident at an angle normal to the flat surface. However, as the angle of incident light increases from the normal, the cross-sectional area of the flat surface decreases as a function of the cosine of the angle. Accordingly, the planar photodiode's response is related to the angle of the incident light by the angle's cosine.

Further, photodiodes, like most photodetectors, suffer from an additional effect that depends on the angle of the incident light called Fresnel reflection. Fresnel reflection generally occurs whenever light travels through a surface between two materials having different indices of refraction, for example, air and glass or silicon. As the incident light angle increases from the normal, the Fresnel reflection also increases, which decreases the amount of light actually entering the detector.

Currently known hemispherical light detectors generally employ either a translucent diffuser or a multi-element detector system. The translucent diffuser is a sheet of translucent material placed over the photodiode's surface. Incident light passes through the translucent sheet and is diffused over a large angle, a portion of which is intersected by the photodiode. The translucent diffuser can be made of many materials including ground glass, acrylics, or Teflon. However, the translucent diffuser fails to eliminate the cosine effect discussed above and, because the photodiode intercepts only a portion of the diffused light, it is generally inefficient. Multi-element detectors employ several photodiode elements that are each configured to cover a predetermined spherical sector. Coverage over a larger spherical sector is obtained by combining the signals from the several detectors. While multi-element detector systems are capable of providing hemispherical coverage, their reliance upon multiple elements dramatically increases the cost and complexity of the system. The effectiveness of the multi-element detector systems is also lessened due to non-uniformities which occur from transitions from one element to the next.

Accordingly, there is a need for a light detector which is relatively insensitive to the angle incidence of a light source in a relatively simple and cost effective manner. The present invention satisfies this need.

SUMMARY OF THE INVENTION

Briefly, and in general terms, the present invention resides in a light detector that provides a response signal based on the intensity of light incident from any direction within a predetermined sector. The light detector includes a base, mask and a sensor. The base has a surface formed of a diffusely reflective material that defines a reflective region that faces the spherical sector. The mask is spaced a predetermined distance from the reflective region and is located between the base and the predetermined sector such that, when light is incident at an angle normal to the base's surface, the mask occludes a portion of the reflective region. The sensor is responsive to incident light and generates the response signal based on the intensity of light that it receives and the sensor is located to intercept light reflections from the base surface. The base, mask and sensor are configured such that the light detector is uniformly responsive to light from any direction within the predetermined sector.

In a more detailed feature of the invention, the reflective region further includes a hemispherical cavity and the reflective region is defined by the cavity's aperture. Further, the reflective region further includes a shoulder that surrounds the cavity's aperture. Also, the mask is a circular disk having at least one flat surface and an axis through the flat surface's center. The disk's axis is aligned with an axis through the center of the hemispherical cavity such that the disk's flat surface is parallel with the cavity's aperture.

In another detailed feature of the invention, the disk's diameter is about 90% of the diameter of the hemispherical cavity. Also, the mask is spaced away from the aperture at a distance that is about 10% to 15% of the diameter of the hemispherical cavity. Further, the sensor is a photodiode located between the mask and the reflective region, and its response signal is an electrical signal.

In another detailed feature of the invention, the light detector further includes a deflector that directs light incident from a direction nearly parallel with the aperture toward the aperture. The light deflector may be an orthogonal pair of baffles that are oriented to diffusely reflect light incident from a direction nearly parallel with the aperture toward the aperture and the photodiode. Also, the deflector may be formed from a disk having a thickness that is about 10% of the diameter of the hemispherical cavity. The disk's edge is beveled and reflective so that it directs light incident from a direction nearly parallel with the aperture toward the aperture.

Other features and advantages of the present invention should become apparent from the following description of the preferred embodiments, taken in conjunction with the accompanying drawings, which illustrate, by way of example, the principles of the invention.

DESCRIPTION OF THE PREFERRED EMBODIMENTS

Figure 1:
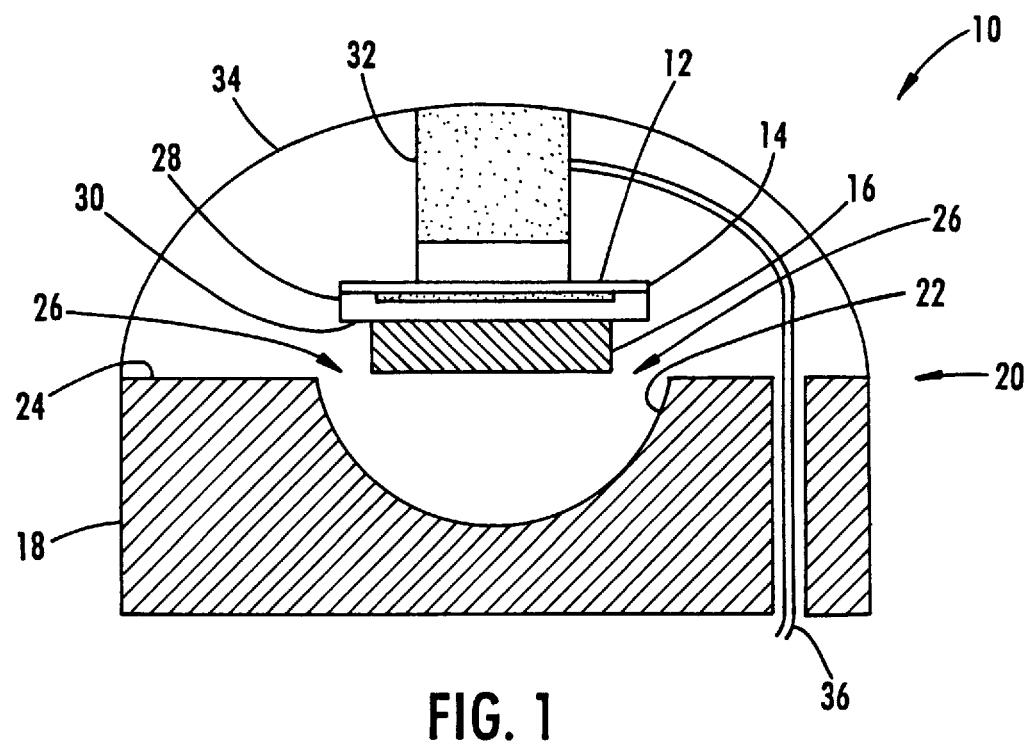
FIG. 1 is a cross-sectional view of a first embodiment of a hemispherical light detector, in accordance with the present invention, that uniformly measures the intensity of light from any direction in a hemisphere using a single photodiode element.

With reference now to the drawings, and in particular to FIG. 1, there is shown a first embodiment of a hemispherical light detector 10 that provides an electrical signal based on the intensity of light incident from any direction within a predetermined sector of a spherical or other appropriate coordinate system. The light detector includes a photodiode 12, a disk-shaped mask 14, a deflector 16, and a diffusely reflective base 18. The detector's geometrical configuration compensates for the angle or direction dependent response of a standard photodiode.

The base 18 is a disk-shaped block of material having, formed in its upper flat surface 20, a hemispherical cavity 22 that is surrounded by a flat ring-shaped shoulder 24. A significant function of the hemispherical cavity is to provide a diffusely reflective surface that averages the incoming light at the cavity's aperture and a cavity with a hemispherical shape is preferred because of its azimuthal symmetry and its ease in construction. However, other cavity shapes are acceptable. For purposes of describing the light detector's operation, a good approximation is obtained by treating the cavity as if it were a diffusely reflective flat surface that averages the incident light in the plane of the cavity's aperture 26. Preferably, the base is constructed of Spectralon®, which is a highly reflective polymeric block material manufactured and sold by Labsphere Inc., of North Sutton, N.H. Spectralon® is easily machined, very durable, and provides a highly efficient Lambertion surface having a reflectivity of over 99%, in near-infrared and visible wavelengths. A Lambertian surface emits light with a substantially uniform intensity in all directions. Alternatively, the base could be constructed of a suitable base material of, for example, aluminum or plastic with the reflective surfaces, i.e., the hemisphere and the shoulder, coated with a diffusely reflective material such as barium sulfate or Spectralon®.

The photodiode 12 is a commercially available photodiode (PIN-25DP) sold by United Detector Technologies (UDT) Sensors, Inc., of Hawthorne, Calif. The photodiode is mounted in a protective can 28 having a front window 30 and a rear-mounted BNC connector 32. In this embodiment, the protective can also functions as the mask. The photodiode assembly is held in place over the base 18 by a Pyrex® dome 34 that covers the base's upper side. The photodiode generates an electrical current generally proportional to the intensity of light incident on its surface. The photodiode is connected to external measurement electronics using a standard BNC connector and appropriately gauged electrical wires 36. Suitable measurement electronics can be readily obtained from a variety of electronic amplifier manufacturers.

Figure 2:
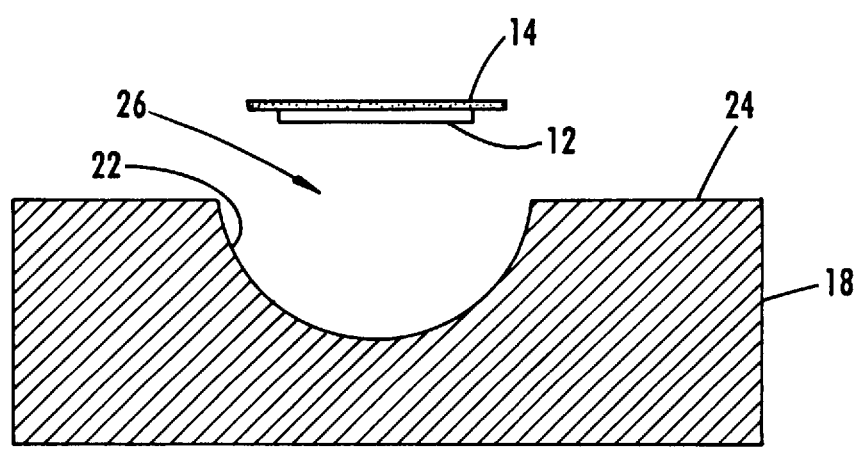
FIG. 2 is a cross-sectional view showing selected elements of the hemispherical light detector of FIG. 1, to emphasize the geometrical relationship between the photodiode element and a mask and a diffusely reflective surface.

The geometrical relationship between the can or mask 14, the photodiode 12, and the aperture 26 formed by the base cavity 22 are shown in FIG. 2. The ratio between the mask's diameter and the aperture's diameter, and the distance between the mask and the aperture, are the most significant parameters in optimizing the light detector's response uniformity and efficiency. The limits on the response uniformly define the limits of the response sector. A more uniform response is obtained, or the response sector increases, as the mask/aperture diameter ratio approaches one. However, the detector's sensitivity decreases as the mask aperture/diameter ratio approaches one because the aperture's acceptance area necessarily decreases. In the embodiment shown, the mask's diameter is 1.68 inches and the aperture's diameter is 1.86 inches, which results in a mask/aperture diameter ratio of approximately 0.9 or 90%. A mask/aperture diameter ratio of 0.9 provides a relatively uniform response and large response sector while maintaining an acceptable sensitivity. Further, the disk-shaped mask is spaced away from the aperture by 0.19 inches resulting in a mask distance to aperture diameter ratio of approximately 0.1 or 10%.

Figure 3A:
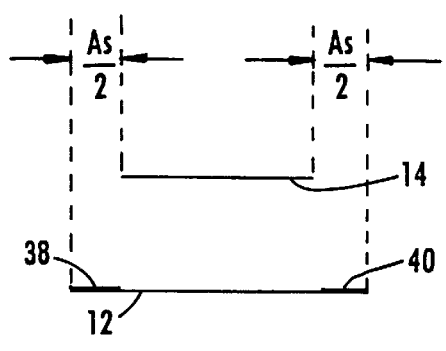
FIG. 3A is a schematic diagram of a mask and a photodiode's surface, in accordance with the present invention, illuminated by light incident at an angle normal to the photodiode's surface.
Figure 3B:
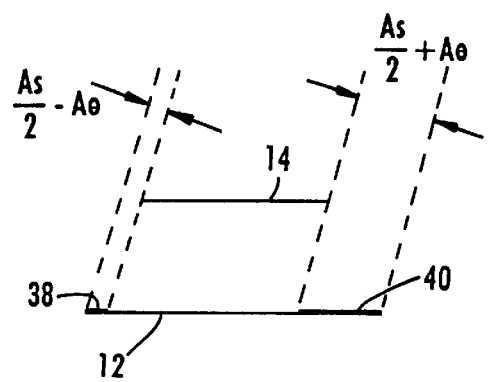
FIG. 3B is a schematic diagram of a mask and a photodiode's surface, in accordance with the present invention, illuminated by light incident at an angle of approximately 15 degrees from normal.
Figure 3C:
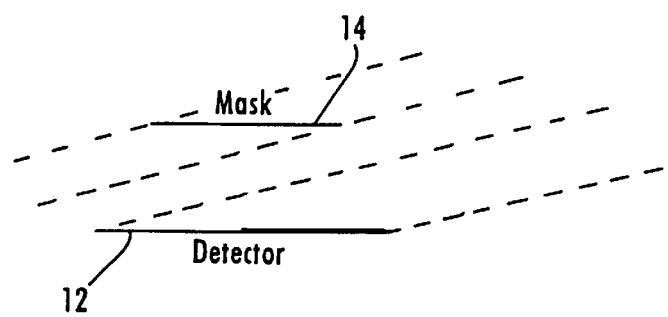
FIG. 3C is a schematic diagram of a mask and a photodiode's surface, in accordance with the present invention, illuminated by light incident at an angle of approximately 75 degrees from normal.

With reference to FIGS. 3A–3C, the light detector 10 takes advantage of a technique called constructed occlusion to reduce the cosine dependence of a photodiode 12. In the occlusion technique, the mask's diameter is slightly less than the photodiode's diameter. When the light is incident at an angle normal to the surfaces of the mask 14 and photodiode, only the incident light not intercepted by the mask reaches the photodiode, as indicated by the two regions, 38 and 40, each having a width of $A_S/2$ (FIG. 3A). The total cross-sectional width of the two regions is $A_S$. As the angle of the incident light increases from the normal direction, the cross-sectional width of the light in the first region 38 decreases by $A_\theta$ while the cross-sectional width of the light in the second region increases by $A_\theta$ (FIG. 3B). Accordingly, as long as a portion of the mask's shadow remains on the photodiode, the decreasing incident light in the first region is compensated by the increasing incident light in the second region, so that the combined or total cross-sectional width of incident light in both regions on the photodiode remains at approximately $A_S$. More specifically, as the angle of the incident light increases even further from the normal direction, the first region 38 eventually disappears and the occluded region, or the region under the mask's shadow, decreases as it moves off the photodiode, causing the second region 40 to further increase. Accordingly, the increasing second region 40, as the mask's shadow moves off the photodiode, nearly compensates for the cosine effect. Thus, when the mask's diameter is appropriately sized and spaced from the photodiode, the photodiode's response remains nearly constant for all incident light angles except at angles near the horizon or nearly parallel with the photodiode's surface. At the angles near the horizon, where the mask's shadow is no longer on the photodiode, the constructed occlusion effect of the mask ceases and, accordingly, the cross-sectional width of the incident light on the photodiode, and thus the photodiode's response, is again cosine dependent (FIG. 3C).

Figure 4A:
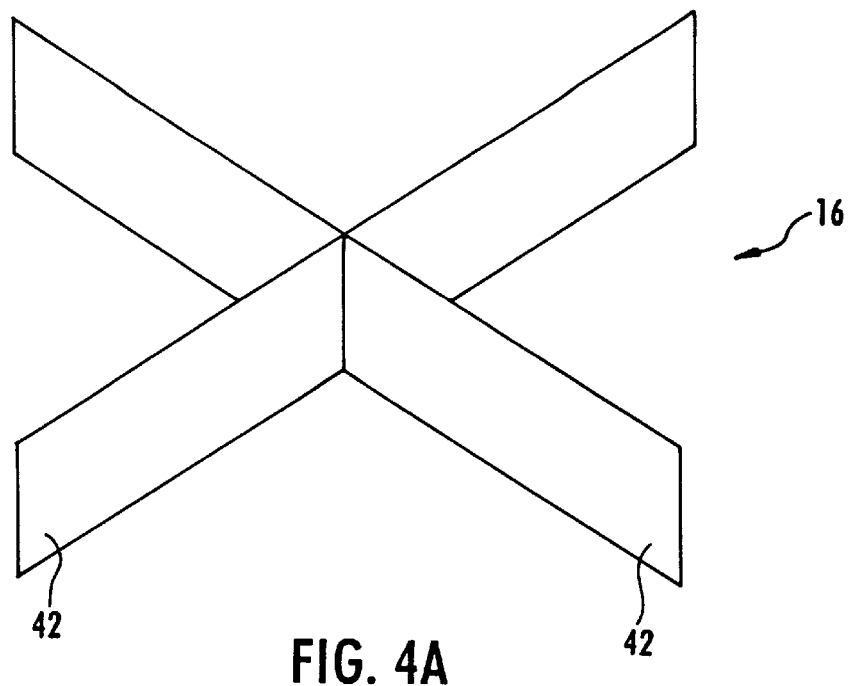
FIG. 4A is a perspective view of a deflector, in accordance with the present invention, that diffusely reflects light incident at an angle nearly horizontal to the photodiode's surface.
Figure 4B:
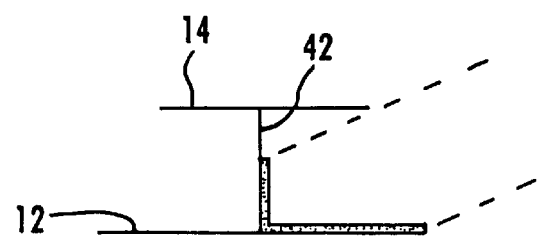
FIG. 4B is a schematic diagram of a mask, a photodiode's surface, and the deflector of FIG. 4A, illuminated by light incident at an angle of approximately 75 degrees from normal.
Figure 5:
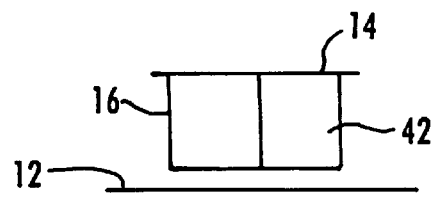
FIG. 5 is a schematic diagram of a mask and a photodiode's surface, in accordance with the present invention, further including the deflector of FIG. 4.

The photodiode's reduced response for angles near the horizon is compensated by the deflector. As shown in FIG. 4A, the deflector 16 is a vertical cross-like structure formed of two generally orthogonal planar baffles 42. The baffles may be constructed of Spectralon® or of a suitable base material, such as plastic, coated with a diffusely reflective material, such as barium sulfate. The baffles extend generally perpendicular to the photodiode's surface and have a length substantially equal to the photodiode's diameter and a width or height substantially equal to the distance between the mask and the aperture. As shown in FIG. 4B, the baffles allow detection of light incident at angles near the horizon by intercepting it and diffusely reflecting it toward the photodiode and the aperture 26 (FIG. 1), or toward the photodiode 12 and the mask 14 (FIG. 5). Preferably, the height of the baffles is selected such that, for light incident at angles near the horizon, the cross-sectional area of the baffles is nearly equal to the regions or areas $A_S$ (FIG. 3A) for light incident at angles near the normal direction.

Figure 6:
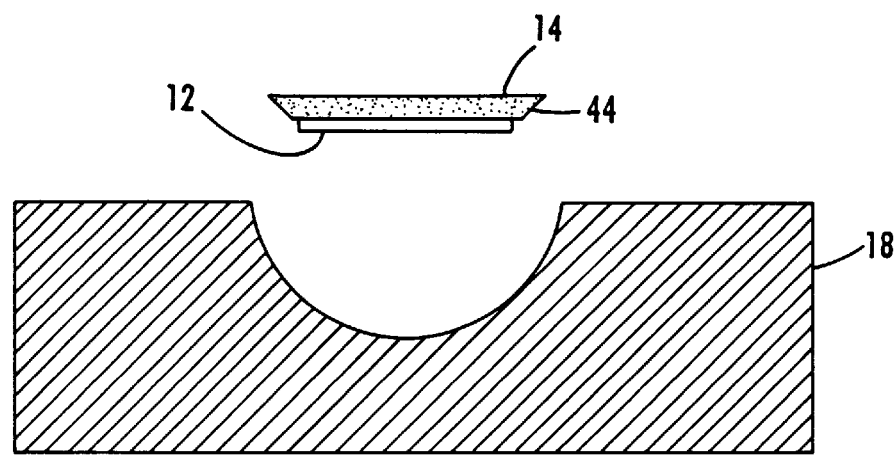
FIG. 6 is a cross-sectional view of a beveled mask, in accordance with the present invention, having beveled sides that reflects light incident at an angle nearly horizontal to the photodiode's surface.

In an alternative embodiment of the deflector 16, shown in FIG. 6, the mask 14 is formed of a reflective material, such as Spectralon®, having a substantial thickness and the mask's edges 44 are beveled to form the deflector. The beveled edges provide a reflective surface that directs nearly horizontal incoming light toward the aperture or the photodiode.

The base's shoulder 24 (FIGS. 1 and 2) improves the forward sensitivity of the detector 12 and reduces its sensitivity to light incoming from below the horizon. The shoulder diffusely reflects light incoming from above the horizon and some of it reaches the photodiode, and the shoulder blocks incoming light from below the horizon that would otherwise reach the photodiode in the shoulder's absence.

Figure 7:
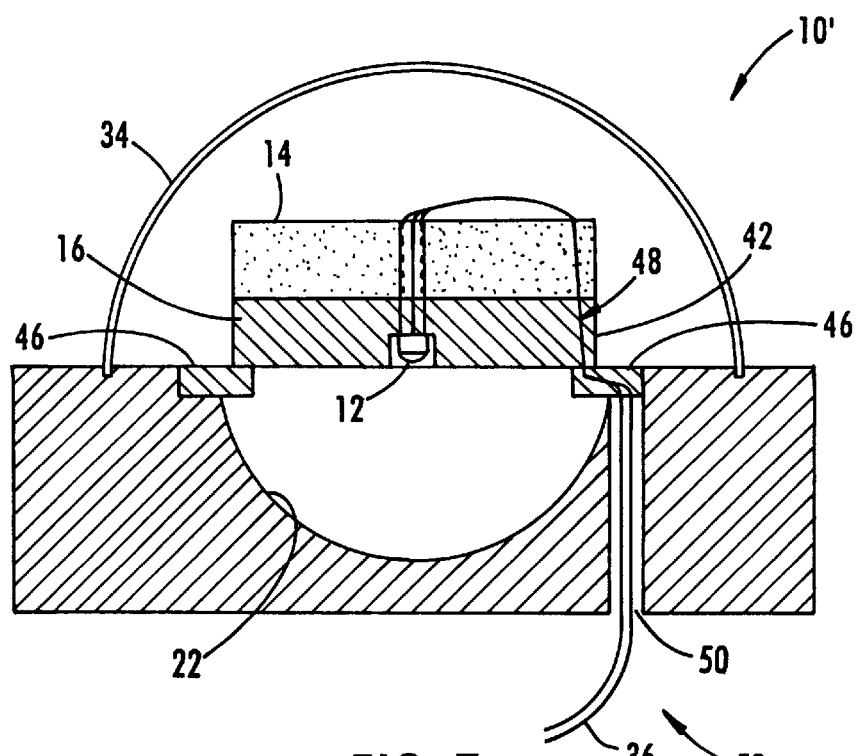
FIG. 7 is a cross-sectional view of a second embodiment of a hemispherical light detector, in accordance with the present invention.

An alternative embodiment of a light detector 10' of the present invention is shown in FIG. 7. In this embodiment, the dome 34 is optional because the mask 14 and photodiode 12 are supported by the deflector's baffles 42. The photodiode is a small pin diode (UDT: PIN 040A) mounted in a small recess at the intersection of the baffles and the mask has a diffusely reflective surface. The hemispherical cavity 22 has a 1 inch radius, the mask/aperture diameter ratio is 0.9 or 90% and the mask is spaced 0.3 inches from the aperture 26, resulting in a mask distance to aperture diameter ratio of 0.15 or 15%. The baffles have a thickness of about 3 millimeters and further have legs 46 that extend to mounting slots in the base 18. At least one baffle also has a small hole 48 bored through it and its leg, and a corresponding small hole 50 is bored through the base from the appropriate slot to the rear 52 of the base. Small wires 36 pass through the holes allowing for electrical connection to the photodiode from the rear of the base.

The uniformity of the direction response for any of the light detector's embodiments, 10 and 10', can be empirically optimized using a variety of parameters. For example, the height, relative diameter, thickness, and reflectivity of the mask 14, the width and reflectivity of the shoulder 24, the height and reflectivity of the deflector 16, the shape, size, and reflectivity of the cavity 22, and the photodiode's diameter, all affect the light detector's directional response. Conversely, the direction response can be tailored to be nonuniform, if desired, by varying specific parameters. For example, decreasing the distance between the mask and the aperture will decrease the spherical sector of the detector's response, while increasing the detector's efficiency. Further, the light detector's spectral response can be tailored by using spectrally selective paint on the diffusely reflective surfaces.

Although the foregoing discloses the presently preferred embodiments of the present invention, it is understood that those skilled in the art may make various changes to the preferred embodiments shown and described, without departing from the scope of the invention. The invention is defined only by the following claims.

We claim:

1. A light detector that provides a response signal based on the intensity of light incident from any direction within a predetermined sector, comprising:

a base having a surface formed of a diffusely reflective material that defines a reflective region that faces the predetermined sector;

a mask spaced a predetermined distance from the reflective region and located between the base and the predetermined sector such that, when light is incident at an angle normal to the base's surface, the mask occludes a portion of the reflective region;

a sensor, responsive to incident light, that generates the response signal based on the intensity of light that it receives and that is located to intercept light reflections from the base surface, wherein the base, mask and sensor are configured such that the light detector is substantially uniformly responsive to light from any direction within the predetermined sector, wherein the reflective region further includes a hemispherical cavity and the reflective region is defined by the cavity's aperture and a shoulder surrounding the cavity's aperture.

2. A light detector as defined in claim 1, wherein the mask is circular disk having at least one flat surface and an axis through the flat surface's center that is aligned with an axis through the center of the hemispherical cavity such that the disk's flat surface is parallel with the cavity's aperture.

3. A light detector that provides a response signal based on the intensity of light incident from any direction within a predetermined sector, comprising:

a base having a surface formed of a diffusely reflective material that defines a reflective region that faces the predetermined sector;

a mask spaced a predetermined distance from the reflective region and located between the base and the predetermined sector such that, when light is incident at an angle normal to the base's surface, the mask occludes a portion of the reflective region;

a sensor, responsive to incident light, that generates the response signal based on the intensity of light that it receives and that is located to intercept light reflections from the base surface, wherein the base, mask and sensor are configured such that the light detector is substantially uniformly responsive to light from any direction within the predetermined sector, wherein the reflective region further includes a hemispherical cavity and the reflective region is defined by the cavity's aperture, and wherein the mask is a circular disk having at least one flat surface and an axis through the flat surface's center that is aligned with an axis through the center of the hemispherical cavity such that the disk's flat surface is parallel with the cavity's aperture, and wherein the diameter of the disk is about 90% of the diameter of the hemispherical cavity.

4. A light detector as defined in claim 3, wherein the mask is spaced away from the aperture at a distance that is about 10% to 15% of the diameter of the hemispherical cavity.

5. A light detector that provides a response signal based on the intensity of light incident from any direction within a predetermined sector, comprising:

a base having a surface formed of a diffusely reflective material that defines a reflective region that faces the predetermined sector;

a mask spaced a predetermined distance from the reflective region and located between the base and the predetermined sector such that, when light is incident at an angle normal to the base's surface, the mask occludes a portion of the reflective region;

a sensor, responsive to incident light, that generates the response signal based on the intensity of light that it receives and that is located to intercept light reflections from the base surface, wherein the base, mask and sensor are configured such that the light detector is substantially uniformly responsive to light from any direction within the predetermined sector, wherein the reflective region further includes a hemispherical cavity and the reflective region is defined by the cavity's aperture, and wherein the mask is a circular disk having at least one flat surface and an axis through the flat surface's center that is aligned with an axis through the center of the hemispherical cavity such that the disk's flat surface is parallel with the cavity's aperture, and further wherein the sensor is a photodiode located between the mask and the reflective region, and its response signal is an electrical signal.

6. A light detector as defined in claim 5, wherein the photodiode is attached to the disk's flat surface.

7. A light detector as defined in claim 6, further comprising a deflector that directs light incident from a direction nearly parallel with the aperture toward the aperture.

8. A light detector as defined in claim 7, wherein the light deflector is an orthogonal pair of baffles that are oriented to diffusely reflect light incident from a direction nearly parallel with the aperture toward the aperture and the photodiode.

9. A light detector as defined in claim 8, wherein the disk has a thickness that is about 10% of the diameter of the hemispherical cavity and the disk's edge is beveled and reflective so that is directs light incident from a direction nearly parallel with the aperture toward the aperture.

10. A light detector as defined in claim 1, further comprising a deflector that reflectively directs light incident from a direction nearly parallel with the aperture toward the reflective region.

* * * * *